(12) United States Patent
Malone et al.

(10) Patent No.: US 6,851,839 B2
(45) Date of Patent: Feb. 8, 2005

(54) VEHICULAR LAMP ASSEMBLY WITH A SIMPLIFIED STRUCTURE AND CHMSL AND TAIL LAMP INCORPORATING THE SAME

(75) Inventors: Brian J. Malone, Wyoming, MI (US); Todd M. Nykerk, Holland, MI (US); Timothy J. Kelly, Grand Rapids, MI (US)

(73) Assignee: Meridian Automotive Systems, Inc., Dearborn, MI (US)

( * ) Notice: Subject to any disclaimer, the term of this patent is extended or adjusted under 35 U.S.C. 154(b) by 0 days.

(21) Appl. No.: 10/096,267

(22) Filed: Mar. 12, 2002

(65) Prior Publication Data

US 2002/0149946 A1 Oct. 17, 2002

Related U.S. Application Data

(60) Provisional application No. 60/278,929, filed on Mar. 27, 2001.

(51) Int. Cl.$^7$ .............................................. B60Q 1/00
(52) U.S. Cl. ....................... 362/487; 362/543; 362/544; 362/518; 362/546; 362/298; 362/301; 362/33; 362/346; 362/545; 362/539
(58) Field of Search ................................ 362/487, 543, 362/544, 518, 546, 298, 301, 300, 302, 346, 611, 545, 800, 299, 538, 539

(56) References Cited

U.S. PATENT DOCUMENTS

| | | | |
|---|---|---|---|
| 3,511,982 A | | 5/1970 | Salter |
| 3,746,853 A | * | 7/1973 | Kosmian .................... 362/901 |
| 4,047,018 A | | 9/1977 | Harris |
| 4,091,138 A | | 5/1978 | Takagi et al. |
| 4,246,632 A | | 1/1981 | Hancox |
| 4,504,891 A | | 3/1985 | Mazis |
| 4,774,637 A | | 9/1988 | Budde et al. |
| 4,922,395 A | | 5/1990 | Roney |
| 4,935,665 A | | 6/1990 | Murata |
| 5,038,255 A | | 8/1991 | Nishihashi et al. |
| 5,241,457 A | | 8/1993 | Sasajima et al. |
| 5,529,535 A | | 6/1996 | Forish |
| 5,673,995 A | | 10/1997 | Segaud |
| 5,707,130 A | | 1/1998 | Zwick et al. |
| 5,785,534 A | | 7/1998 | Longueville et al. |
| 5,977,489 A | | 11/1999 | Crotzer et al. |
| 6,083,012 A | | 7/2000 | Suzuki et al. |
| 6,100,178 A | | 8/2000 | Todd et al. |
| 6,290,380 B1 | | 9/2001 | Suzuki et al. |
| 6,506,979 B1 | | 1/2003 | Shelnut et al. |
| 6,572,246 B1 | * | 6/2003 | Hopp et al. .................. 392/298 |

FOREIGN PATENT DOCUMENTS

| WO | WO 99/60315 | 11/1999 |
|---|---|---|

* cited by examiner

Primary Examiner—Sandra O'Shea
Assistant Examiner—Bertrand Zeade
(74) Attorney, Agent, or Firm—McDonnell Boehnen Hulbert & Berghoff LLP

(57) ABSTRACT

A lamp assembly comprising a transparent body having a front surface and a back surface, the back surface having at least one convex curved portion, each such convex curved portion having at least one axis perpendicular to the front surface, and an internally reflective curved surface facing the front surface of the transparent body, a cavity in each convex curved portion, having sidewalls and a bottom, adapted to receive a light emitting source, and a reflective surface at the bottom of each cavity oriented so that light emitted by the light emitting source is reflected by the reflective surface onto the internally reflective curved surface of the convex curved portion. In some embodiments, the internally reflective curved surface also provides one or more electrical circuits for one or more light emitting sources.

29 Claims, 16 Drawing Sheets

VEHICULAR LAMP ASSEMBLY WITH A SIMPLIFIED STRUCTURE AND CHMSL AND TAIL LAMP INCORPORATING THE SAME

BACKGROUND OF THE INVENTION

1. Field of the Invention

The invention relates to a vehicular lamp assembly with a simplified structure. In one of its aspects, the invention relates to a vehicular lamp assembly and a center high-mount stop lamp incorporating the same. In another of its aspects, the invention relates to a vehicular lamp body incorporating the reflective surface applied to a rear portion thereof. In another of its aspects, the invention relates to a lamp body having a reflective surface that forms a part of an electrical circuit for powering a plurality of lamps installed thereon. In another of its aspects, the invention relates to a lamp body having a reflective surface adjacent to rear surface thereof in combination with optical elements adjacent to the front surface thereof. In another of its aspects, the invention relates to a lamp body incorporating optical elements on a rear surface and a front surface thereof, in combination with lens elements to form indicator lamps.

2. Description of the Related Art

Prior art lamp assemblies come in many forms for use in vehicles, such as the combination brake/indicator lights 10 or center high-mount stop lamp (CHMSL) 20 illustrated on the vehicle 5 in FIG. 1. Referring to FIG. 2, a known form of lamp includes a hollow lamp housing 10 having one or a number of cavities 12 therein, often parabolic in nature and having a reflective coating applied thereon, and having an aperture 14 at a rear portion thereof for inserting a lamp or lamps 16. The front portion of each of these cavities 12 is covered by translucent lens 18 of a selected color corresponding to the indicator lamp enclosed thereby (i.e., red for braking, amber for turning, white for reverse). Each of the lamps 16 inserted into an aperture 14 in the lamp housing 10 is electrically connected to the electrical system of the vehicle 5, often by a Medusa-like wire harness 17. Other embodiments include the use of printed circuit boards having a number of light-emitting diodes (LED) secured thereto, the printed circuit board then being enclosed in a housing having a translucent lens thereon.

Presently, center high-mount stop lamps using light-emitting diodes are comprised of a number of individual assembled components: housings, lenses, gaskets, printed circuit boards, fresnel lenses, wire harnesses, connectors and grommets. Light-emitting diodes as used in the center high-mount stop lamps and other tail lamps have the further disadvantage of presenting a "hotspot" centered over the light-emitting diode due to the directional nature of the diode, as compared to the substantially omnidirectional nature of a conventional incandescent lamp.

It would be advantageous to reduce the number of components necessary to construct a lamp assembly, and to overcome the other disadvantages of the light-emitting diode design such as the "hot spot" centered on the LED.

SUMMARY OF THE INVENTION

The invention comprises a solid piece of injection-molded plastic having a flat front surface and a rear surface that includes at least one convex parabolic portion having an axis perpendicular to the front surface. A substantially cylindrical cavity is formed in the solid piece of plastic sharing a common axis with the parabolic portion. The bottom surface of the cavity is conical and centered in the cavity with the apex of the cone directed away from the flat front surface. In one embodiment, metallic particles are deposited on the parabolic portion and on the surface of the cone in the bottom of the cavity. A lamp, such as a light-emitting diode, is inserted in the cavity so that it directs light at the cone in the bottom of the cavity. This light is reflected by the metallic deposit on the cone into the transparent material surrounding the cavity. The light is then reflected within the transparent material from the parabolic reflective surface so that it is directed toward the flat front surface and emerges from the solid piece of injection-molded plastic substantially perpendicular to the flat front surface. The rear surface will also include a rib or other obstruction to form a discontinuity in the deposit of the metallic particles to effectively create electrically isolated portions of the metallic deposit that can serve as circuit legs for electrically connecting the light-emitting diode to a power source.

DESCRIPTION OF THE PREFERRED EMBODIMENT

Figure 1:
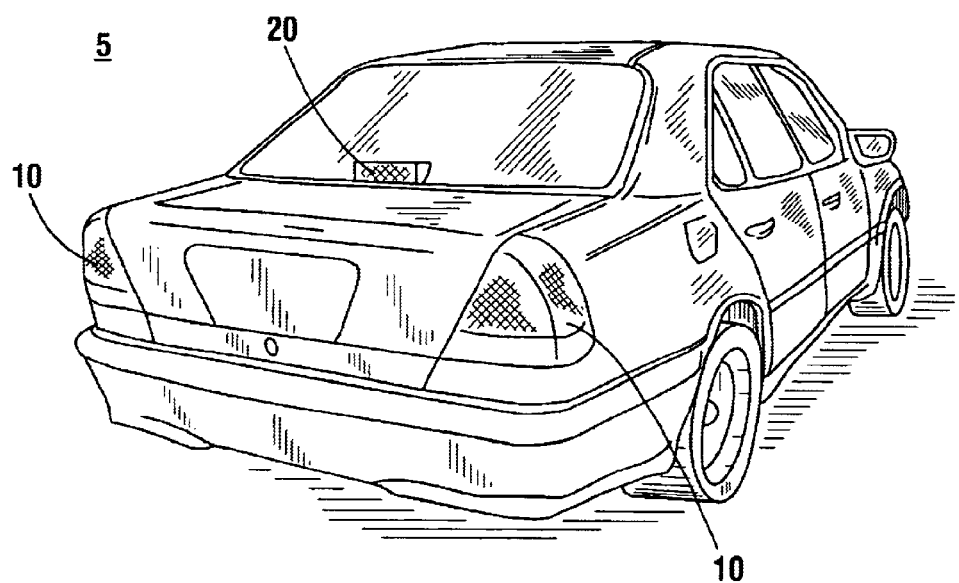
FIG. 1 is a perspective of view of a vehicle displaying a number of combination brake/indicator lamps and a CHMSL.
Figure 2:
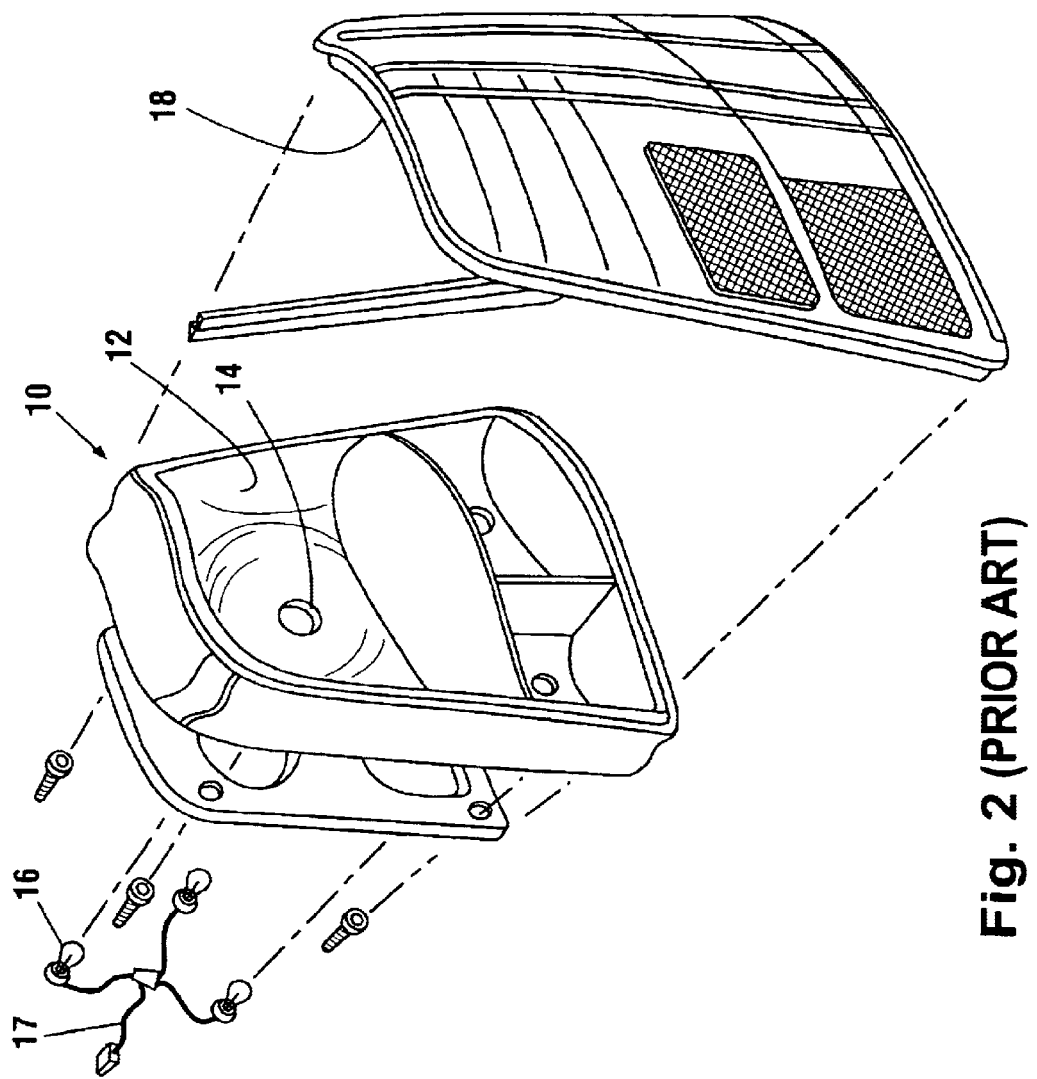
FIG. 2 is an exploded perspective of view of a prior art combination brake/indicator lamp.
Figure 3:
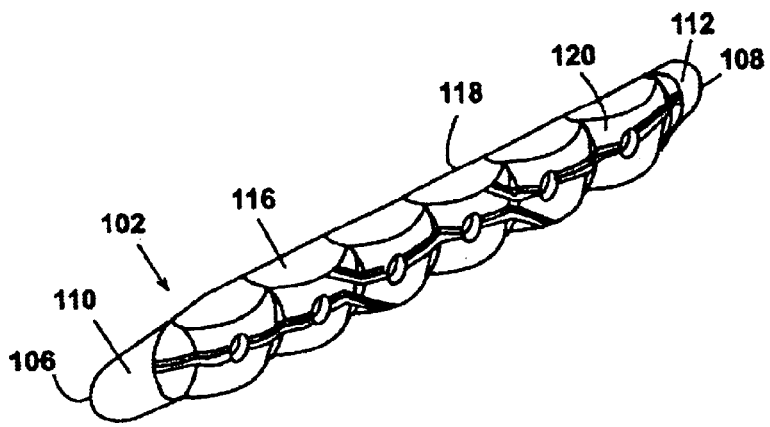
FIG. 3 is a perspective view of a vehicular lamp body according to the invention.
Figure 6:
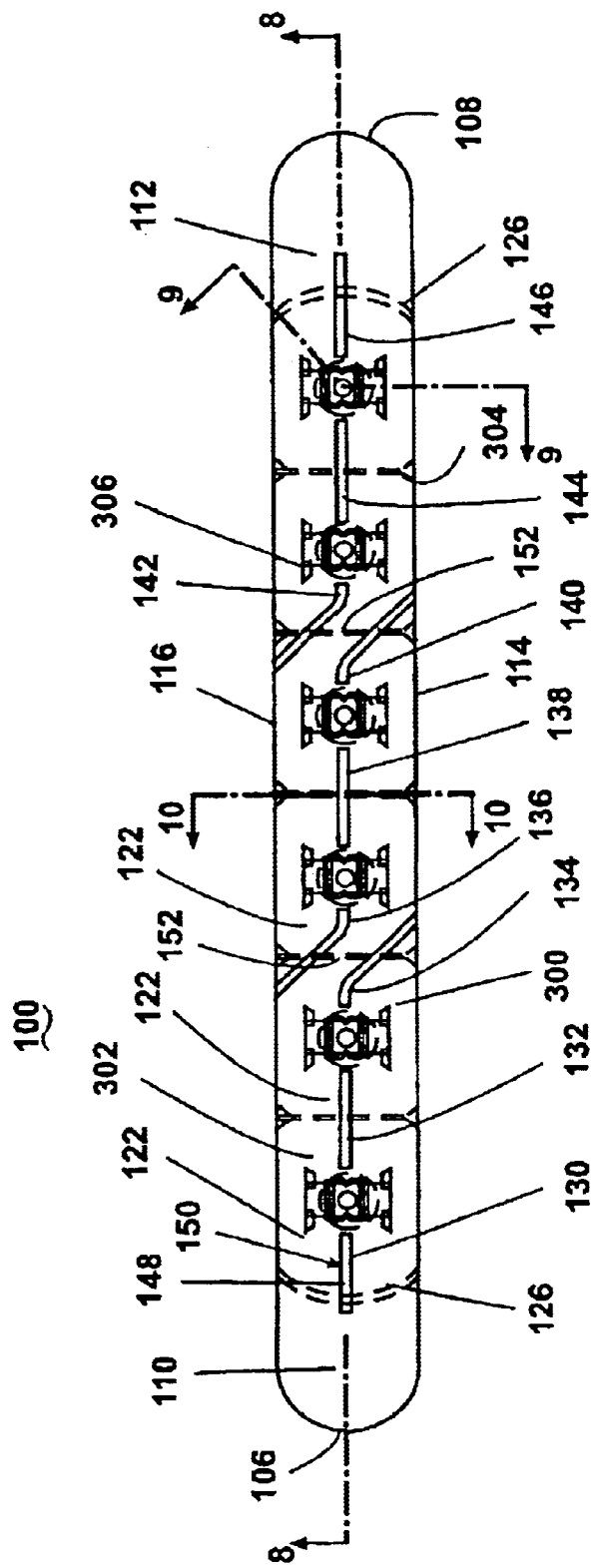
FIG. 6 is a rear view of a unitary vehicular lamp assembly according to the invention incorporating the lamp body of FIGS. 3–5.

Referring now to FIGS. 3 and 6, a vehicular lamp assembly according to the invention comprises a solid injection-molded body 102 constructed of a transparent or translucent plastic material. The body 102, in the preferred embodiment, is elongate having a first end 106 comprising a mounting flange 110 and a second end 108 comprising a mounting flange 112, and a first substantially flat face 118 and a second contoured face 120. The first and second faces 118, 120 are joined by first and second edges 114, 116 substantially perpendicular to first face 118. In the preferred embodiment, the plastic material of the body 102 is described as clear for maximizing the transmission of light therethrough, although it is anticipated that the plastic material can be tinted to affect transmission of light of the chosen color or intensity.

Figure 4:
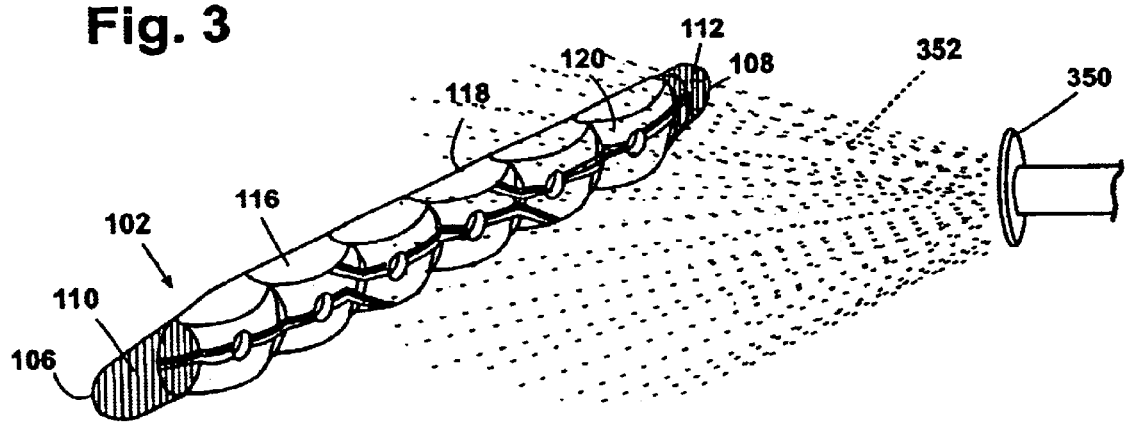
FIG. 4 is a conceptual view of direct metallization of a copper deposit onto the lamp body of FIG. 3.
Figure 5:
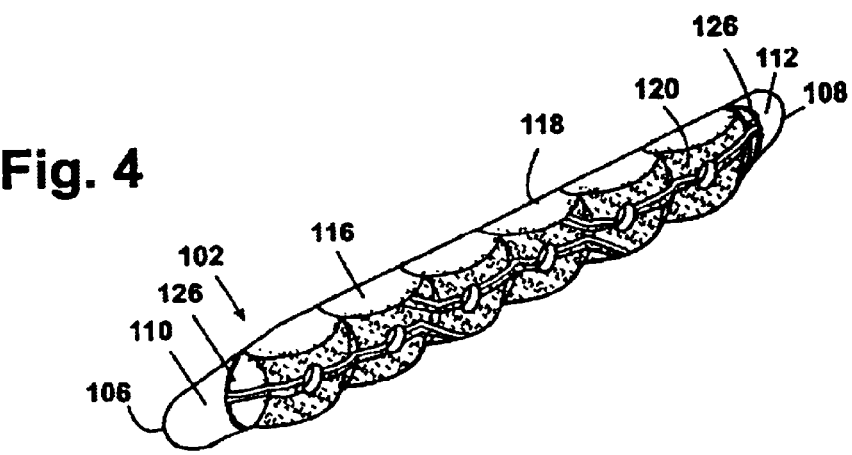
FIG. 5 is a perspective view of the lamp body of FIG. 3 with a copper coating applied by direct metallization.

After formation of the body 102 by injection molding, a material having reflective properties is applied to the second face 120 of the body 102, the material also having electrically conductive properties. An example of a process suitable for accomplishing this is shown in the U.S. provisional application No. 60/262,502, filed Jan. 18, 2001, commonly owned, entitled METHOD FOR VACUUM DEPOSITION OF CIRCUITRY ONTO A THERMOPLASTIC MATERIAL AND A VEHICULAR LAMP HOUSING INCORPORATING THE SAME, which is incorporated herein by reference in its entirety. Referring to FIGS. 4 and 5, and as further disclosed in the aforementioned provisional application, the body 102 is placed in a vacuum metallization chamber including a target 350 emitting a stream of metallic particles for deposit on second face 120. Referring to FIG. 6, mounting flanges 110, 112 do not receive a metallic deposit, being outside a direct metallization mask boundary 126 which defines the limit of the body 102 exposed to direct metallization.

Figure 7:
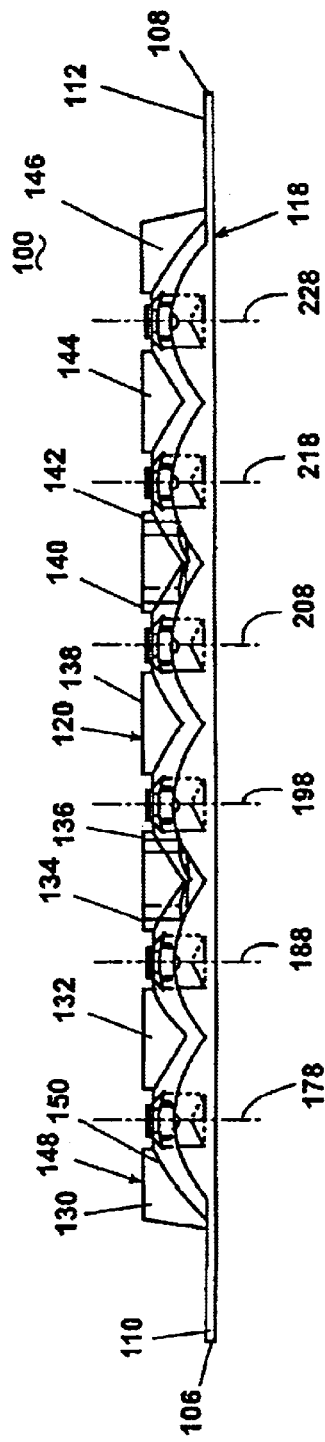
FIG. 7 is a plan view of the unitary vehicular lamp assembly of FIG. 6.
Figure 8:
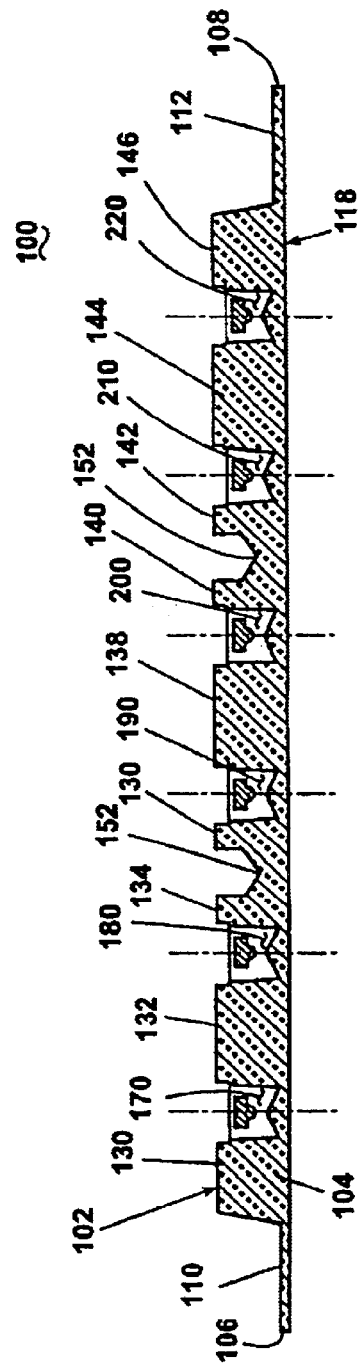
FIG. 8 is a cross-sectional view taken through line 8—8 of FIG. 6.

Referring now to FIGS. 6–8, the unitary vehicular lamp assembly 100 comprising injection-molded body 102 has a substantially planar first face 118 and a contoured second face 120. The second face 120 comprises a plurality of convex parabolic surface portions 122 and a number of ribs 130, 132, 134, 136, 138, 140, 142, 144, 146 projecting from second face 120 beyond the parabolic surface portions 122, interrupting the continuity of the parabolic surface portions 122 on the second face 120.

The body 102 is further molded with a plurality of substantially cylindrical cavities 170, 180, 190, 200, 210, 220 opening to the contoured second face 120 of the body 120 perpendicular to first face 118, each of the cavities 170–220 centered on the primary axis of a parabola defined by parabolic surface portions 122 of the second face 120.

Figure 9:
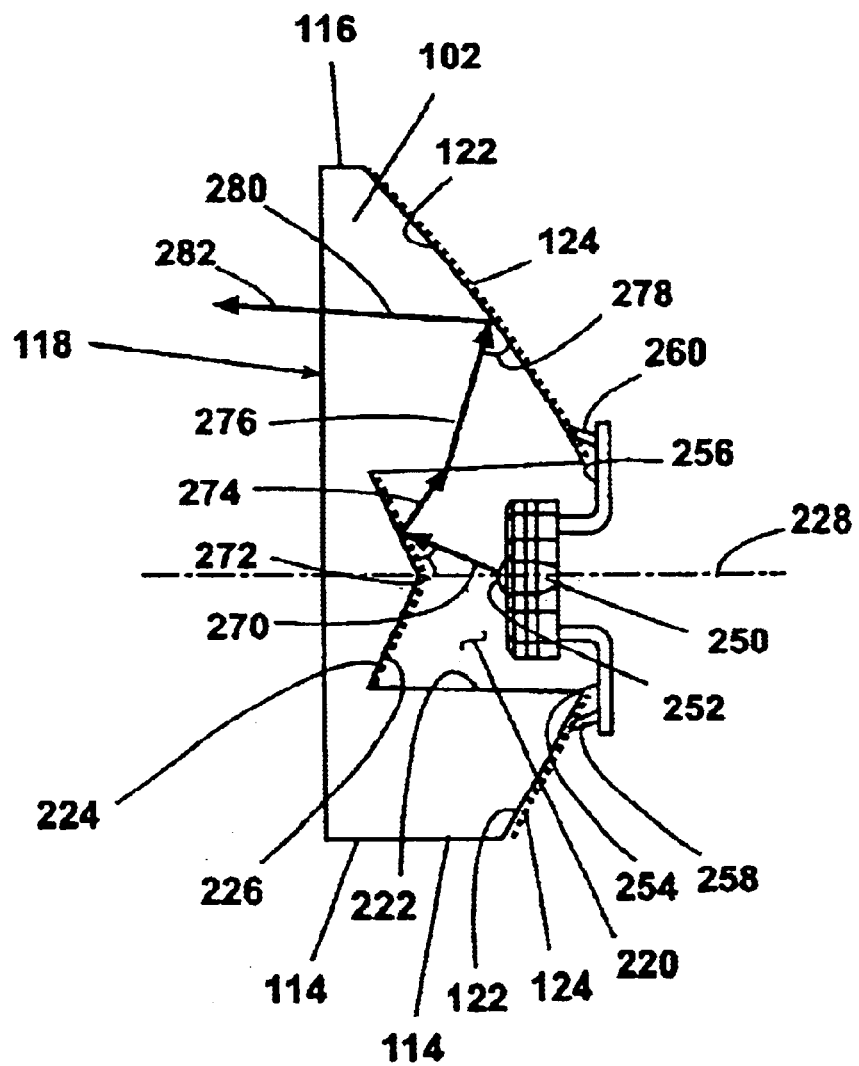
FIG. 9 is a cross-sectional view taken through line 9—9 of FIG. 6.

Referring to FIG. 9, cavity 220 is illustrated as an example of each of the cavities 170–220 and comprises a substantially cylindrical wall 222 and a conical floor surface 224, the right cone defined thereby being centered in the cylindrical cavity 220 and sharing a central axis 228 with the parabola defined by the parabolic surface portions 122 surrounding the cavity 220. As can be seen in FIG. 9, a metallic deposit 226 covers the conical floor 224 of cavity 220. Following the example of FIGS. 4 and 5 of a method to apply a metallic coating to second face 120 of body 102, as the body 102 is subjected to the stream of metallic particles that deposits a metallic coating 124 to the parabolic surface portions 122, the same metallic particles pass into the open cavity 220 and leave a metallic deposit 226 on the conical floor 224 of cavity 220. The cylindrical wall 222 of cavity 220 does not receive a metallic deposit as the stream of metallic particles is substantially parallel to the wall 222. Is also anticipated that masking techniques can be employed to insure that no particles are deposited on the sidewalls 222 of cavity 220.

With further reference to FIG. 9, a light-emitting diode assembly 250 is inserted into cavity 220, centered along cavity centerline 228 with light-emitting diode 252 directed toward conical bottom surface 224 of cavity 220. Light-emitting diode assembly 250 includes first and second leads 254, 256 electrically connected to the deposit 124 on the parabolic surface portions 122 by contacts 258, 260. Light emitted by light-emitting diode 252 directly to the conical floor 224 is illustrated as arrow 270, having an angle of incidence 272. The reflected light 274 refracts slightly as the light 276 enters the body 102. The refracted light 276 strikes the parabolic portion 122 at second angle of incidence 278 and reflects off the deposit 124 on the parabolic portion 122. This reflected light 280 and travels to front flat portion 118 of body 102 to become transmitted light 282 as it exits body portion 102.

Figure 10:
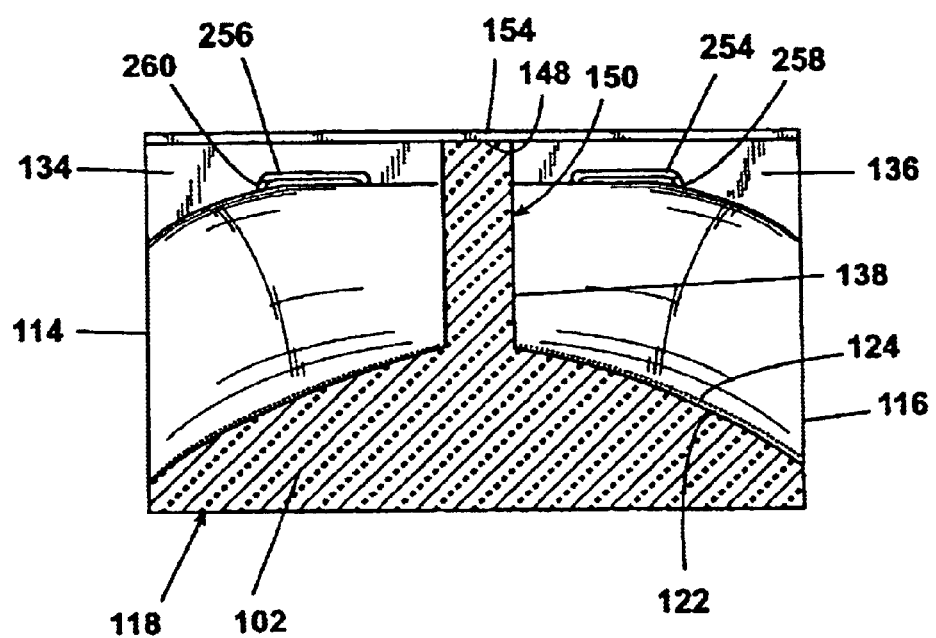
FIG. 10 is a cross-sectional view taken through line 10—10 of FIG. 6.

Referring to FIG. 10, rib 138 has received an incidental metallic deposit 154 on an upper surface 148 subjected to the stream of metallic particles, but rib side surfaces 150 have received no metallic deposit. The metallic deposits 124 on the parabolic surface portions 122 on each side of rib 138 are thereby electrically isolated by the discontinuity of the metallic deposit caused by the presence of rib 138. It is further anticipated that this electrical isolation can be accomplished by masking during a metallization process.

Referring again to FIG. 6, it can be seen that the parabolic surface portions 122 surrounding each of the cavities 170–220 are separated along a centerline of the body 102 by the ribs 130, 132, 134, 136, 138, 140, 142, 144, 146. Specifically, the parabolic surface portions 122 surrounding cavity 170 are divided along a centerline of the body 102 by ribs 130, 132; the parabolic surface portions 122 surrounding cavity 180 are separated by ribs 132, 134; the parabolic surface portions 122 surrounding cavity 190 are separated by ribs from 136, 138; the parabolic surface portions 122 surrounding cavity 200 are separated by ribs 138, 140; the parabolic surface portions 122 surrounding cavity 210 are separated by ribs 142, 144; and the parabolic surface portions 122 surrounding cavity 220 are separated by ribs 144, 146. The parabolic surface portions 122 surrounding adjacent cavities are not separated by a rib 130–146 and the metallic deposit 124 on these parabolic circuit portions 122 is therefore electrically continuous.

Ribs 134, 136, 140, 142 are not fully contained on the centerline of the body 102 but run from the centerline to a respective edge 114, 116 of the body 102. The parabolic surface portions 122 on a given side of the centerline adjacent to cavity 180 is thereby isolated from the parabolic surface portions 122 adjacent to cavity 190 on the same side of the centerline. The parabolic surface portions 122 between cavity 180 and edge 116 are rather continuous with the parabolic surface portions 122 between cavity 190 and opposing edge 118 on the opposite side of the centerline of body 102 through an interstitial space 152 between rib 134 and rib 136. The ribs 140, 142 between cavities 200, 210 are likewise arranged to provide a "crossing-over" of the connection between the parabolic surface portions 122 surrounding the adjacent cavities 200, 210.

Figure 11:
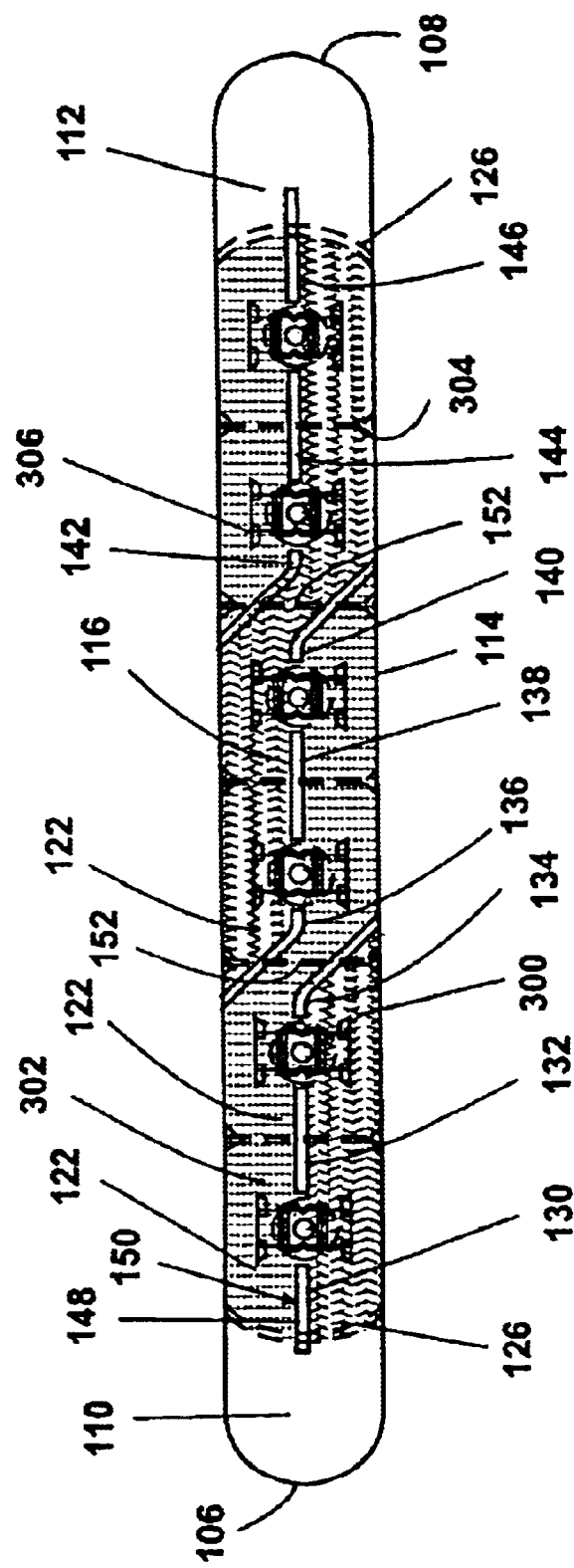
FIG. 11 is a rear view of the unitary vehicular lamp assembly according to the invention, highlighting the circuit traces electrically connecting the light-emitting diodes of the assembly.
Figure 12:
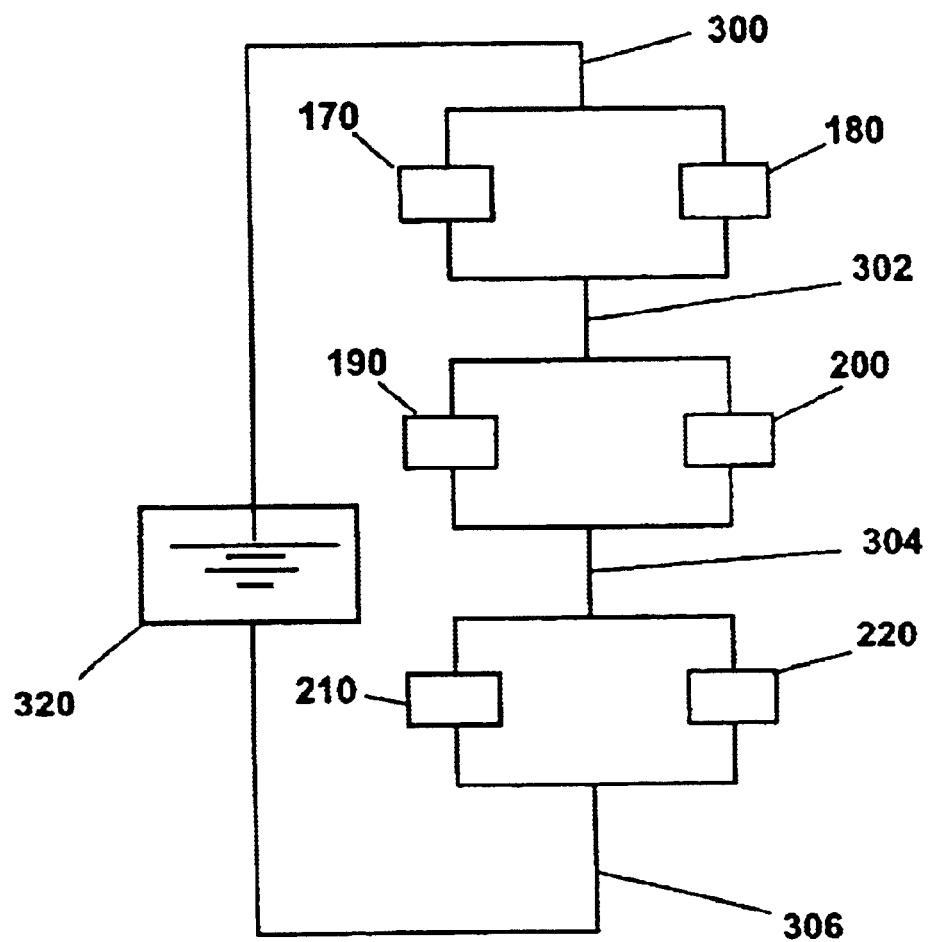
FIG. 12 is a circuit diagram representing the circuit traces of FIG. 11.

Referring to FIGS. 11 and 12, the interstitial spaces 152 between ribs 134, 136 and ribs 140, 142, respectively, join the parabolic surface portions 122 surrounding the adjacent cavities to create "S"-shaped circuit legs 302 and 304 respectively. A power source 320, such as a vehicle's political system, is connected at a first end to circuit leg 300 comprising parabolic surface portions 122 adjacent a first side of cavities 170, 180. Circuit leg 302 electrically connects the parabolic surface portions 122 of a second side of cavities 170, 180 with the parabolic surface portions 122 of a first side of cavities 190, 200. Circuit leg 304 likewise connects cavities 190, 200 with cavities 210, 220 and circuit leg 306 connects cavities 210, 220 to a ground of power source 320. This circuit arrangement is given as an example of how circuits can be arranged on a rear surface of a lamp assembly to interconnect a plurality of lamps installed in the assembly.

Figure 13:
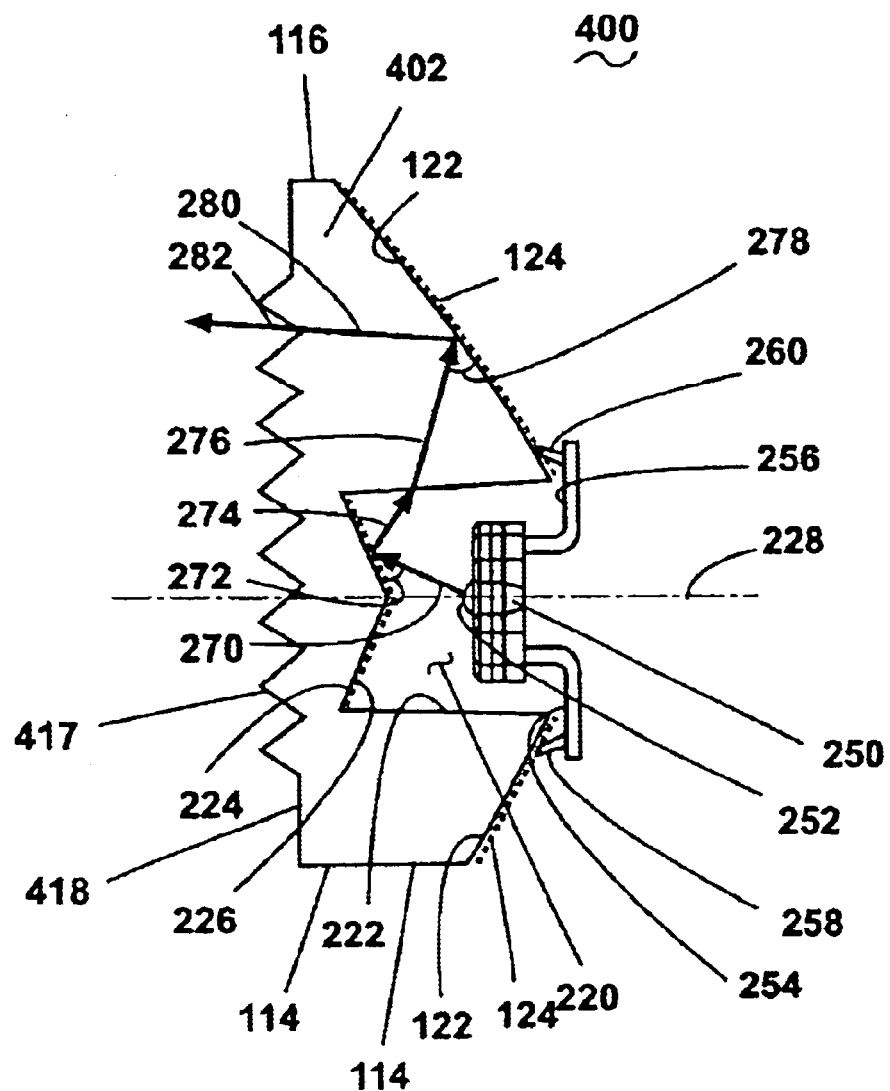
FIG. 13 is a cross-sectional view of a further embodiment of the invention.
Figure 14:
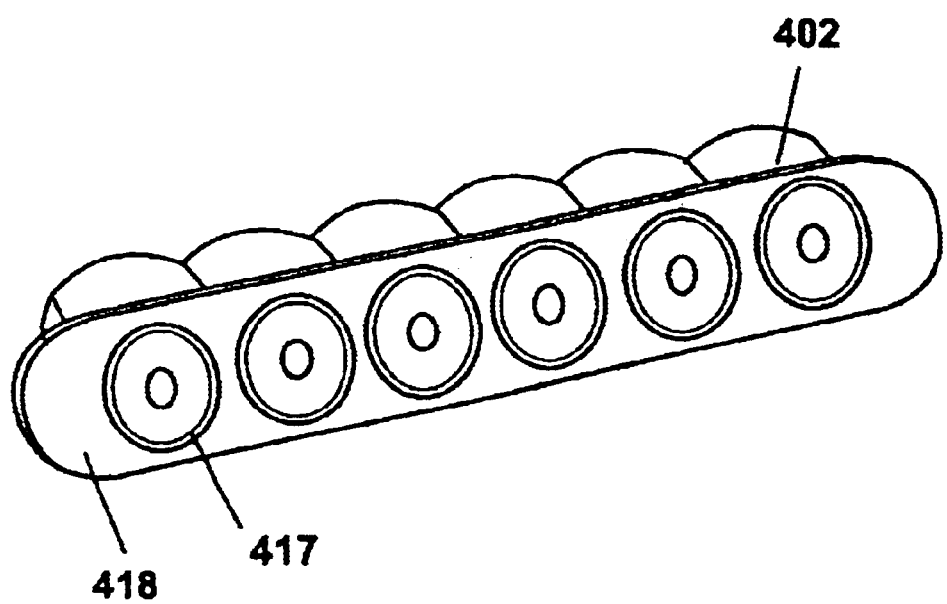
FIG. 14 is a perspective view of the embodiment of FIG. 13.

Referring now to FIGS. 13–18, further embodiments of the invention are disclosed. In FIGS. 13–14, body 402 includes optical elements 417 such as a fresnel lens formed in front face 418. Light is transmitted from the light-emitting diode 252, reflected off the coating 226 on the conical base 224 of the cavity 220 and the coating 124 on the rear surface of the body 402. The light is further modified by passing through the optical elements 417 formed in front face 418 of body 402.

Figure 15:
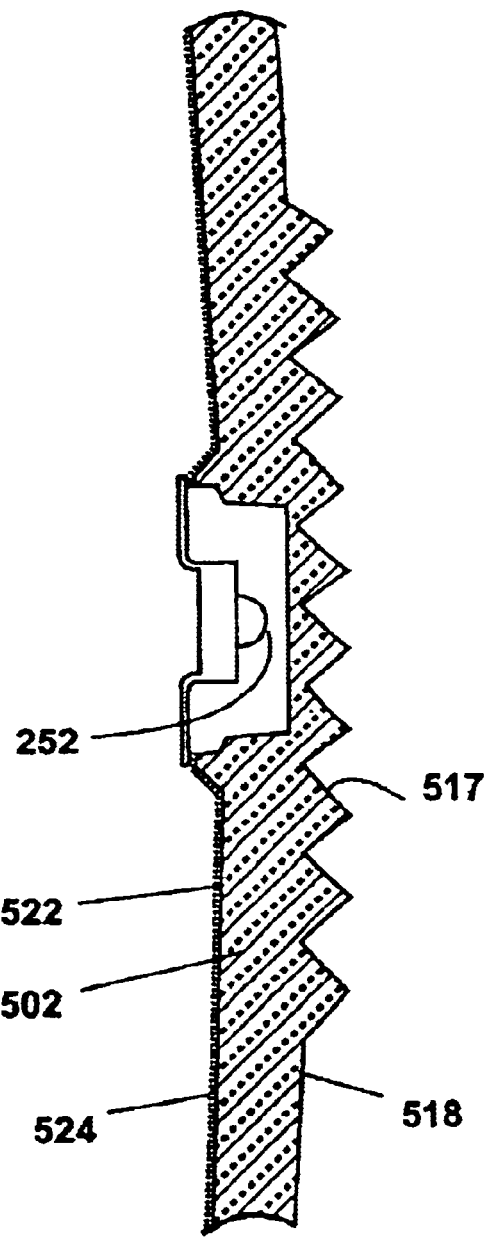
FIG. 15 is a cross-sectional view of a further embodiment of the invention.
Figure 16:
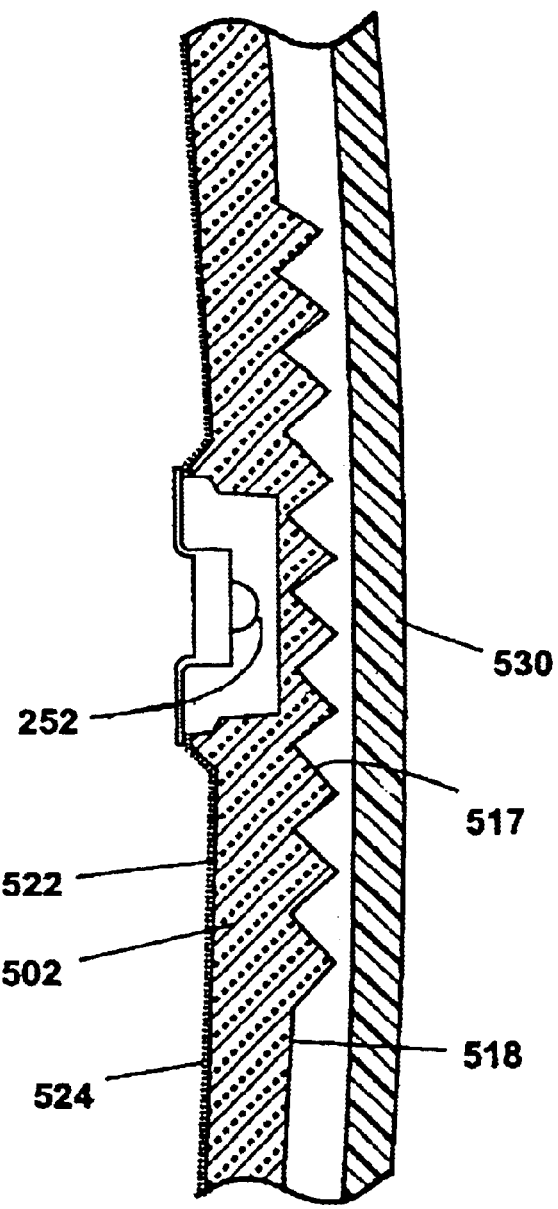
FIG. 16 is a cross-sectional view of a further embodiment of the invention.

A further embodiment is disclosed in FIG. 15 wherein a coating 524 deposited on a rear surface 522 of a body 502 performs primarily as an electrical circuit with only incidental reflective performance in directing light from an LED 252 through optical elements 517 such as a fresnel lens on front surface 518 of body 502. Referring to FIG. 16, a further embodiment of the invention includes the embodiment of FIG. 15 further incorporated into a lamp assembly including a lens 530. Lens 530 is anticipated as having coloration for serving indicator functions, such as making brake lights red or turn signals amber, or containing other optical properties such as diffusion.

Figure 17:
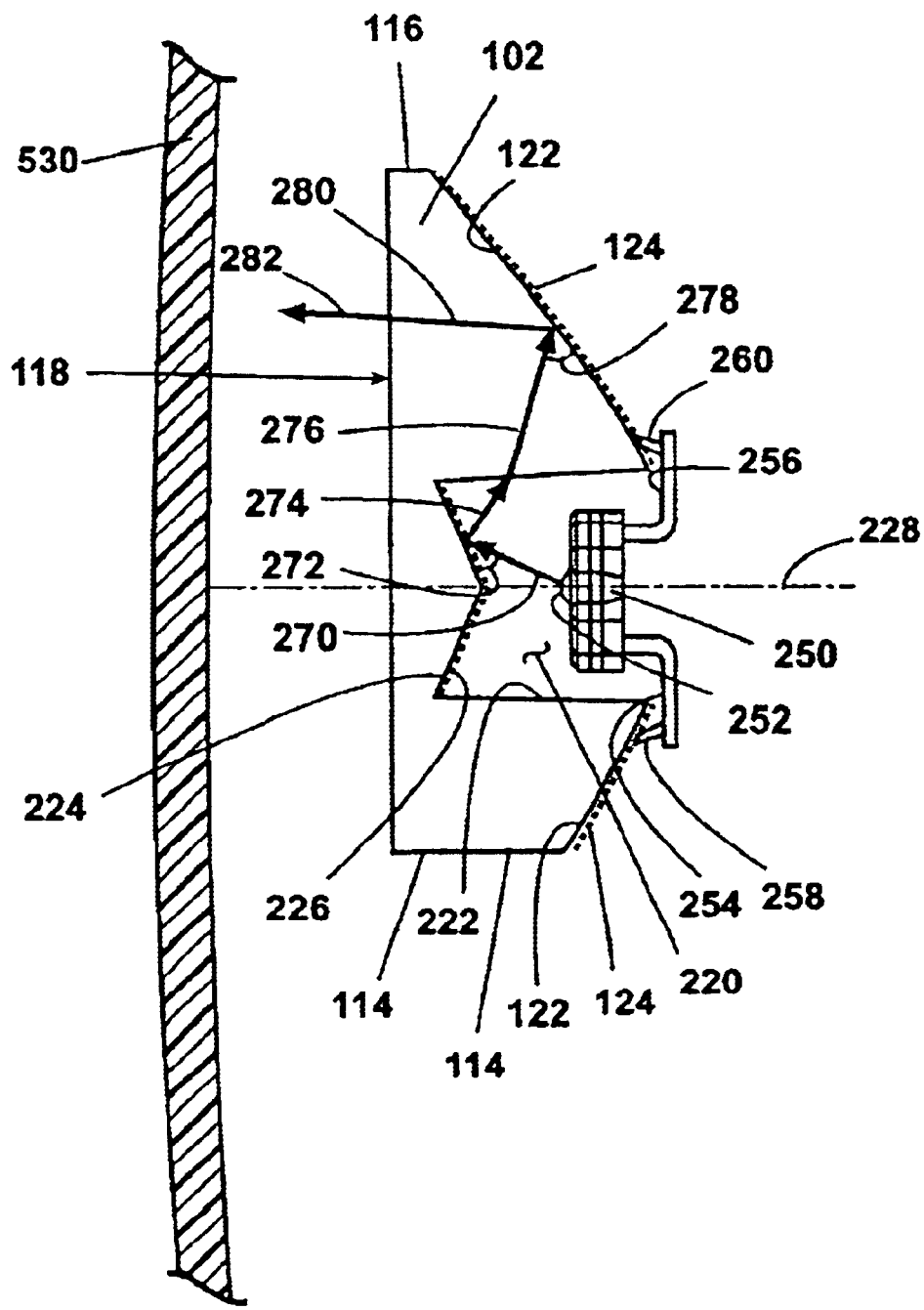
FIG. 17 is a cross-sectional view of a further embodiment of the invention.

A further embodiment is disclosed in FIG. 17, wherein the embodiment of FIG. 9 is combined in a lamp assembly with a lens 530.

Figure 18:
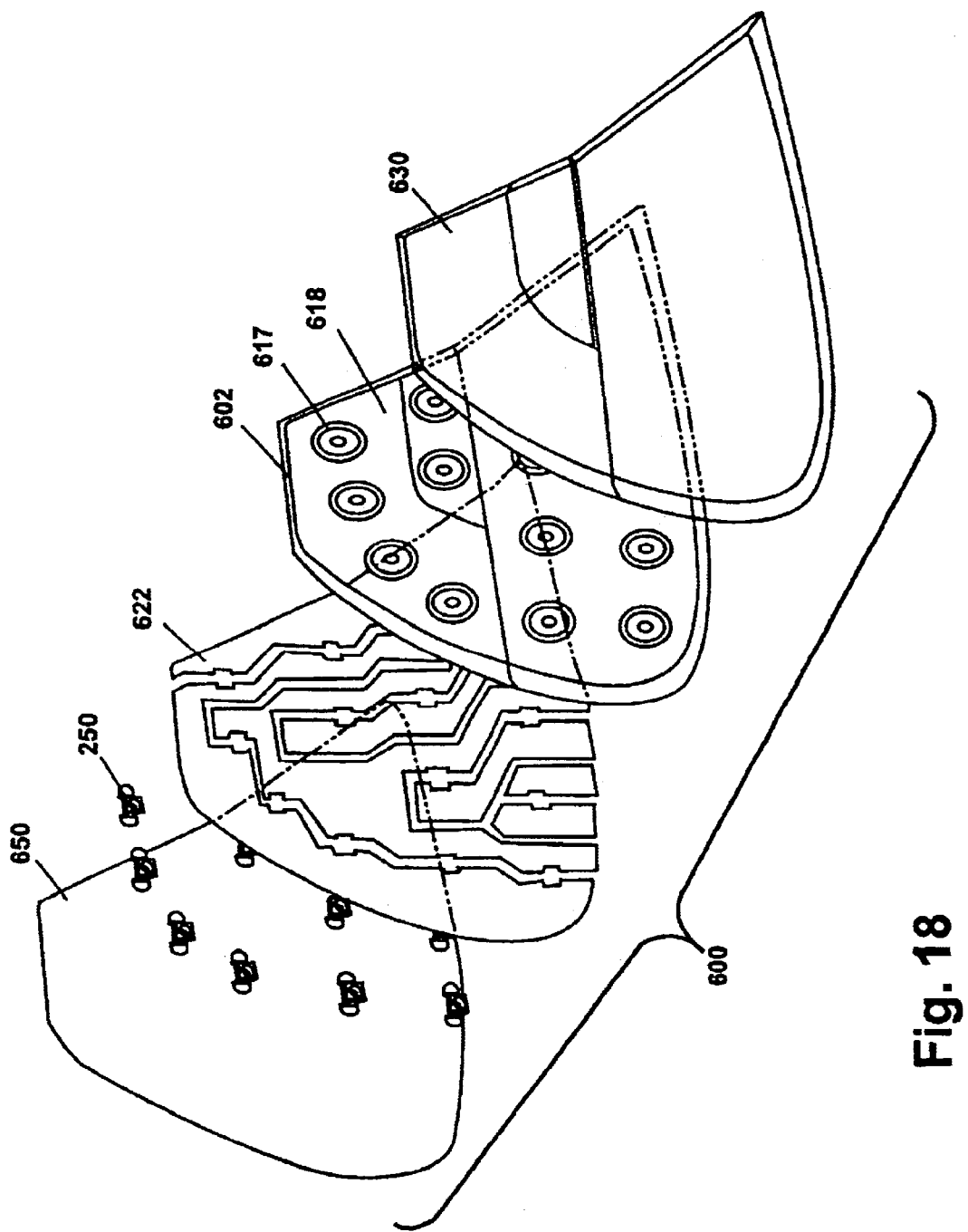
FIG. 18 is an exploded perspective view of a further embodiment of a unitary vehicular lamp assembly according to the invention.
Figure 19:
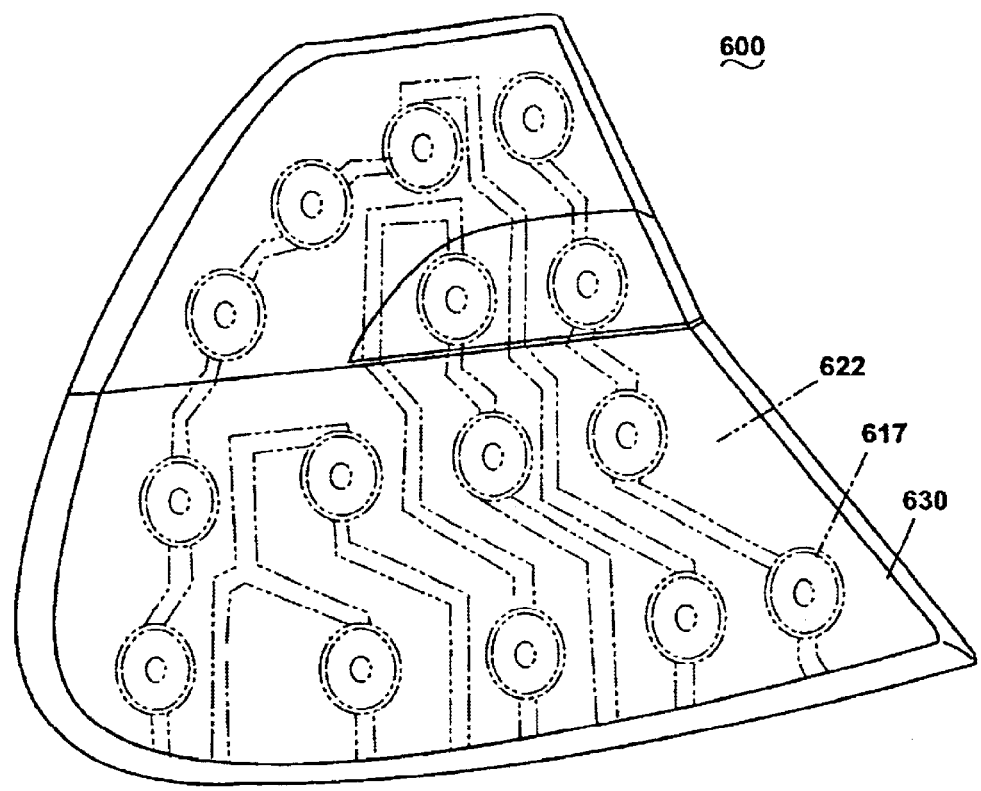
FIG. 19 is a perspective view of the embodiment of FIG. 18.

Referring to FIGS. 18–19, a further embodiment of a tail lamp assembly 600 is disclosed in an exploded form to show the elements of the assembly 600 and the circuits formed in a deposit 622 to be applied to a rear surface of body 602. Tail lamp assembly 600 comprises body 602, a lens 630, a deposit 622, a plurality of light-emitting diodes 250 and a conformal seal coating 650. Body 602 includes a front face of 618 with a plurality of optical elements 617 formed over a corresponding plurality of cavities, each cavity for receiving a light-emitting diode 250 as disclosed in the previous embodiments. Deposit 622 is applied to a rear surface of body 602 so as to form an arrangement of circuits interconnecting the cavities formed in the body 602. Light-emitting diodes 250 are inserted in the cavities of body 602 and electrically connected to the deposits 622 on the rear surface of body 602. A conformal coating 650 is anticipated for use to protect the deposit 622 on the rear surface of body 602 from moisture and physical damage, and to electrically insulate it from surrounding components in a vehicle. FIG. 19 illustrates the assembled tail lamp assembly 600 with the optical elements 617 and deposit 622 shown in phantom. It is further anticipated that the embodiment of FIGS. 18–19 can be formed with a flat front face 618 of body 602 without optical elements 617. Is further anticipated that the body 602 can be formed with a flat rear surface, or with a contoured rear surface and cavities having a conical base for taking advantage of the reflective properties of the deposit 622 on the rear surface of body 602.

While the invention has been specifically described in connection with certain specific embodiments thereof, it is to be understood that this is by way of illustration and not of limitation, and the scope of the appended claims should be construed as broadly as the prior art will permit.

We claim:
1. A lamp assembly comprising
 a. a transparent body having a front surface and a back surface,
 b. the back surface of such transparent body having at least one convex curved portion, each such convex curved portion having at least one axis perpendicular to the front surface, and having an internally reflective curved surface facing the front surface of the transparent body,
 c. a cavity in each convex curved portion, having sidewalls and a bottom, adapted to receive a light emitting source,
 d. a reflective surface at the bottom of each cavity oriented so that light emitted by the light emitting source is reflected by the reflective surface onto the internally reflective curved surface of the convex curved portion.

2. The lamp assembly of claim 1 wherein the back surface of the transparent body has a plurality of convex curved portions.

3. The lamp assembly of claim 1 or 2 wherein the transparent body is a one-piece structure.

4. The lamp assembly of claim 1 or 2 wherein the transparent body is injection-molded plastic.

5. The lamp assembly of claim 1 wherein each convex curved portion is parabolic along at least one axis.

6. The lamp assembly of claim 1 wherein the internally reflective curved surface of each convex curved portion is parabolic along at least one axis.

7. The lamp assembly of claim 6 wherein the back surface of the transparent body has a plurality of convex curved portions forming a plurality of internally reflective parabolic surfaces.

8. The lamp assembly of claim 1 wherein the cavity is generally cylindrical.

9. The lamp assembly of claim 1 wherein the light emitting source is an LED.

10. The lamp assembly of claim 1 wherein the reflective surface at the bottom of the cavity in each convex curved portion is generally conically shaped.

11. The lamp assembly of claim 1 wherein the reflective surface at the bottom of the cavity in each convex curved portion is formed by the deposition of reflective material onto the bottom of the cavity.

12. The lamp assembly of claim 1 wherein each internally reflective curved surface is comprised of reflective material deposited onto each convex curved portion of the back surface of the transparent body.

13. The lamp assembly of claim 12 wherein the reflective material deposited on each convex curved portion of the back surface of the transparent body is also electrically conductive.

14. The lamp assembly of claim 13 wherein the reflective material deposited on each convex curved portion forms part of an electrical circuit together with one or more leads of each light emitting source.

15. The lamp assembly of claim 13 wherein the reflective material is deposited in at least two electrically isolated sections, with separate electrically isolated sections being connected to at least one of each light emitting source.

16. The lamp assembly of claim 2 wherein the internally reflective curved surface of each of the plurality of convex curved portions is comprised of reflective material deposited on the convex curved portions of the transparent body.

17. The lamp assembly of claim 16 wherein the reflective material deposited on the convex curved portions of the transparent body is also electrically conductive.

18. The lamp assembly of claim 17 wherein adjacent convex curved portions are also electrically interconnected by reflective material deposited on the back surface of the transparent body between adjacent convex curved portions.

19. The lamp assembly of claim 18 wherein the reflective material deposited on and between adjacent convex curved portions forms part of an electrical circuit together with one or more leads of each light emitting source.

20. The lamp assembly of claim 19 wherein the reflective material is deposited in at least two electrically isolated sections, with separate electrically isolated sections being connected to at least one lead of each light emitting source.

21. The lamp assembly of claim 20 having at least four electrically isolated sections.

22. The lamp assembly of claim 15, 20, or 21 wherein the electrically isolated sections are separated by ribs.

23. The lamp assembly of claim 22 wherein the ribs are S-shaped.

24. The lamp assembly of claim 1 wherein one or more optical elements are formed in the front surface of the transparent body.

25. The lamp assembly of claim 24 wherein the optical elements include a fresnel lens.

26. The lamp assembly of claim 1 further comprising a lens positioned in front of the front face of the transparent body.

27. A method for diffusing light from a light source comprising a. forming a transparent body having a front surface and a back surface,
b. forming at least one convex curved portion, such convex curved portion having at least one axis perpendicular to the front surface,
c. forming a cavity in each convex curved portion, having sidewalls and a bottom, adapted to receive a light source,
d. depositing a reflective material on the convex curved portion such that the convex curved portion has an internally reflective curved surface facing the front surface of the transparent body,
e. depositing a reflective material onto the bottom of the cavity, and
f. mounting a light source in the cavity directed toward the reflective material on the bottom of the cavity, so that at least some of the light emitted by the light source is reflected by the reflective material in the bottom of the cavity onto the reflective material forming the internally reflective curved surface, and, in turn reflected toward the front surface of the transparent body.

28. The method of claim 27 wherein the formation of the transparent body, at least one convex curved portion, and a cavity in each convex curved portion is performed in a single injection molding step.

29. The method of claim 27 wherein the deposition of reflective material onto the convex curved portion and onto the bottom of the cavity is performed in a single deposition step.

* * * * *